April 29, 1969 T. F. HOLTZHAUER 3,440,859
CORNER FORMING APPARATUS
Filed Oct. 18, 1966 Sheet 1 of 7

FIG. 1

INVENTOR.
THOMAS F. HOLTZHAUER
BY
ATTORNEYS

INVENTOR.
THOMAS F. HOLTZHAUER
ATTORNEYS

United States Patent Office 3,440,859
Patented Apr. 29, 1969

3,440,859
CORNER FORMING APPARATUS
Thomas F. Holtzhauer, Fairport, N.Y., assignor to Xerox Corporation, Rochester, N.Y., a corporation of New York
Filed Oct. 18, 1966, Ser. No. 587,510
Int. Cl. B21d 31/00, 41/00; B21j 7/16
U.S. Cl. 72—399                10 Claims

ABSTRACT OF THE DISCLOSURE

Apparatus for closing the corners formed by the abutment of side flanges on a cover panel by contacting the corner areas with a movable die member so as to deliver work energy into said corners. The amount of work delivered for each contact is insufficient to warp or damage the panel while the total energy delivered is sufficient to close the corners.

---

This invention relates to apparatus for closing the corners of a preform cover and, in particular, to apparatus for simultaneously coining the corners of a preform cover.

More specifically this invention relates to closing the corners formed by the side flanges of the cover plate or the like to produce a homogeneous exterior surface. It is desirous to make machines such as office copiers, computers and the like which are to be placed in the public view as pleasing to the eye as possible. It is customary, therefore, to eliminate rough corners, weld beads, or other visible defects which would detract from the aesthetic value of the finished product. A conventional method to accomplish this end is to place the mechanical workings of the machine within a skeleton or frame and then enclose the skeleton by means of cover, the cover providing not only the heretofore mentioned aesthetic value but also provide a convenient means of access to the various machine components.

Cover panels are generally precut from standard metal sheet stock and then formed or crimped into shape. To give the sheet metal cover rigidity, the top surface is usually cut oversized with the extended portion being formed to form side and return flanges. The return flange, that is the flange which runs substantially parallel with the top cover surface, also provides a hidden surface by which the cover may be affixed to a machine frame. As can be seen, this type of cover construction provides a top which is one unbroken or uniform surface. However, the point at which the side flanges meet to form a corner must be further worked before a homogeneous cover suitable for finished painting or the like is produced. Converting the preformed cover into a finished product has heretofore proven to be a problem because of the number of operations and amount of time necessary to close the side flanges.

Heretofore, corners formed by the side flanges of a cover have been closed by a "box-form welding method" in which the cover is first clamped in a form or holding device and the side flanges welded closed. The cover is then prepared for finished painting or the like by grinding the weld bead smooth. The welding and grinding operations are most often performed by hand which proves to be time consuming and costly as well as resulting in a non-uniformity of cover shaped due to the irregularity of the hand operation. Furthermore, extreme care must be taken when welding in the confined corner areas so as to minimize plate warpage due to excessive heat build up.

In order to overcome the shortcomings found in welding methods, methods utilizing a single high compressive force to mechanically close the corner have been used with some success. For example, the corner can be placed between two mating dies or the like and a force high enough to form a relatively smooth corner applied. However, it has been found that the force required to close the corner is oftentimes so high that material is forced out of the corner area thereby causing panel warpage. Another adverse effect also noted due to the use of a single relatively high compressive force is a dimpling effect in the top surface of the cover. Small indentations are caused to be formed in the top surface of the cover behind the corners.

Attempts to close more than one corner at a time, that is simultaneously forming a plurality of corners, using compressive forming has also proven extremely difficult. The resultant forces acting on a panel, unless self compensating in that they negate each other, may be of such magnitude as to deform the cover. Extremely short tool life and excessive tool breakage are further disadvantages attributable to the use of a single high compressive forming force, that is failure within a relatively few hits in respect to other forming tools.

It is therefore an object of this invention to improve apparatus for closing the corners of a cover or the like.

A further object of this invention is to improve apparatus for mechanically closing the corner of and cover panel or the like formed by the meeting of side flanges.

It is another object of this invention to form a plurality of corner on a cover or the like in a single operation.

Yet another object of this invention is to provide apparatus for producing rapidly panels having a uniformity of appearance.

Still another object of this invention is to provide corner forming apparatus having a relatively extensive tool life.

It is a still further object of this invention to mechanically finish form the corners of a cover panel without deforming the cover.

Another object of this invention is to provide apparatus for finish forming a plurality of corners on a cover panel simultaneously in a single operation.

These and other objects of this invention are obtained by delivering mechanical energy rapidly and repeatedly into corners which are formed by the meeting of two surfaces such as the side flanges of a cover, the energy being at a level sufficient to coin the surfaces but below that at which the panel will be deformed, to produce a closed homogenous panel.

For a better understanding of this invention as well as objects and further features, thereof, reference is had to the following detailed description of the invention to be read in connection with the accompanying drawings, wherein:

Figure 1:
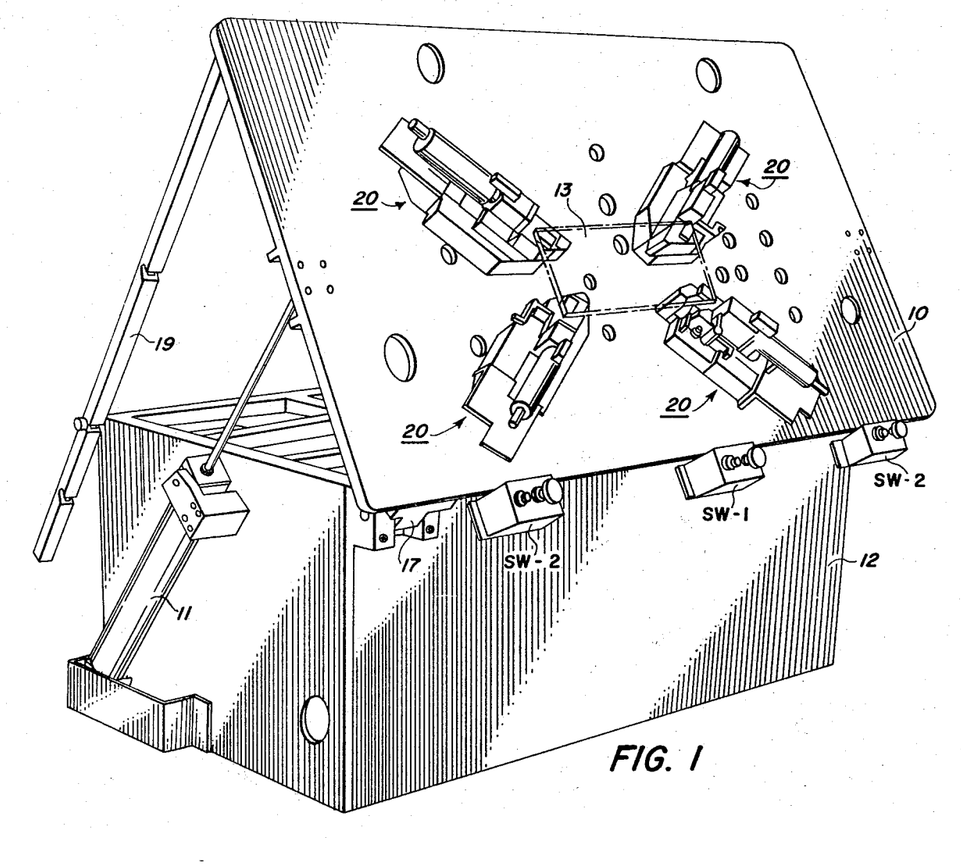
FIG. 1 is an isometric view of the corner forming apparatus embodying the present invention.
Figure 8:
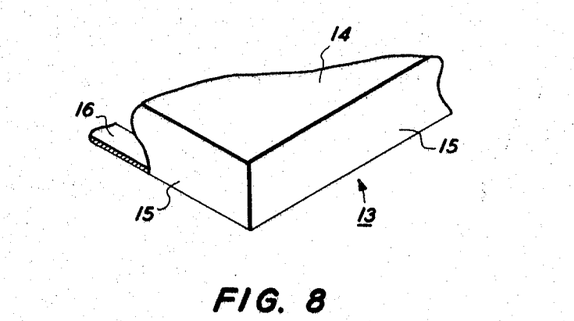
FIG. 8 is a isometric view of a cover having a corner formed by the meeting of two side flanges shown in partial section.

A cover panel 13 is shown positioned between four work stations in FIG. 1, each work station 20 having a work head capable of forming a corner. The cover is formed of a single piece of sheet metal which has been pre-stamped and formed to the desired shape. The cover, as shown in FIG. 8, comprises a top surface 14, side flanges 15, and return flanges 16, the flange sections being provided to give the cover strength and rigidity as well as a means to affix the cover to a machine. This one piece configuration, although relatively simple to preform must be further worked in order to close the panel at the point where the side flanges meet before the cover is ready to be finished painted and mounted on a machine frame. Although, a rectangular, four cornered, covered panel is shown mounted in the apparatus of the preferred embodiment shown in FIG. 1, it should be obvious that more work stations can be added or the stations repositioned to adapt the present invention to accommodate covers of various sizes and shapes.

Work table 10 is provided with a series of locating holes (not shown) so that the working heads 20 can be relocated at various positions to accommodate covers of various sizes and shapes. The work table is pivoted about a hinge 17 enabling the table to be raised and lowered by means of two hydraulic cylinders 11 located at either end of the stationary base 12. With the work stations secured to the table, the table can be adjusted to a position permitting the operator to conveniently load and unload work parts. A safety latch 19 is provided to lock the table at various positions.

Figure 3:
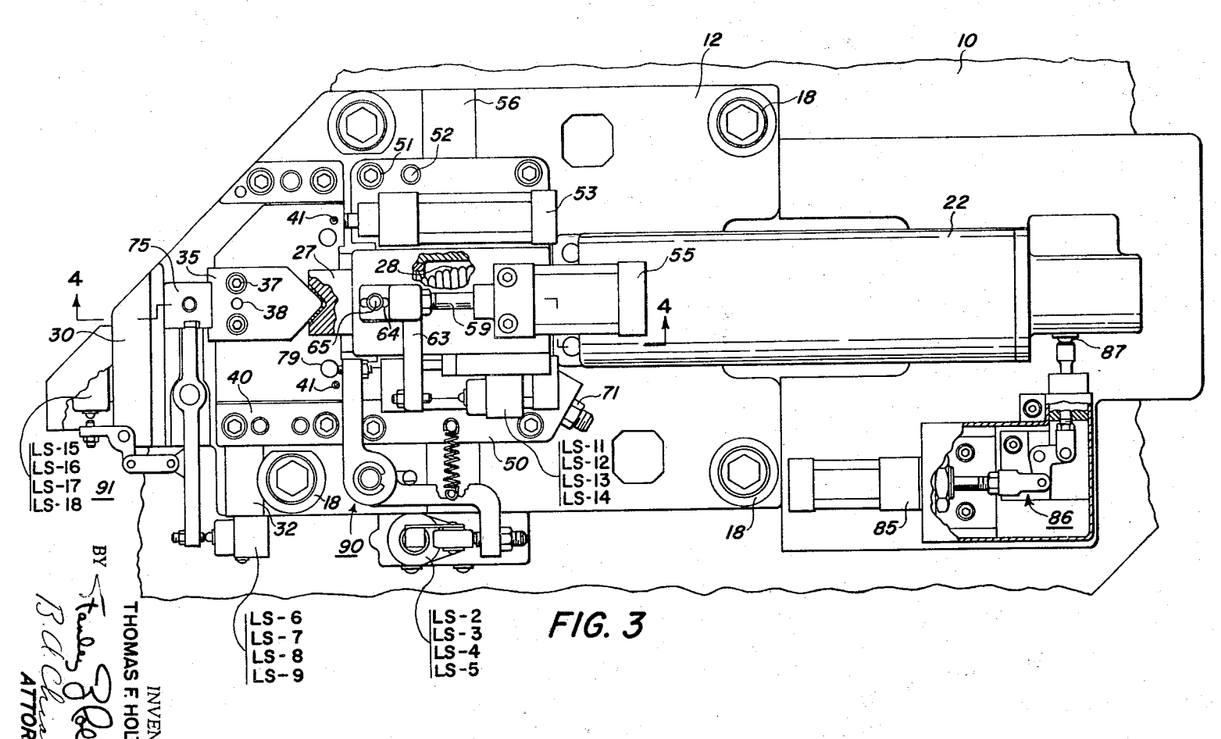
FIG. 3 is a top view of a work station showing a male die member in partial section.
Figure 4:
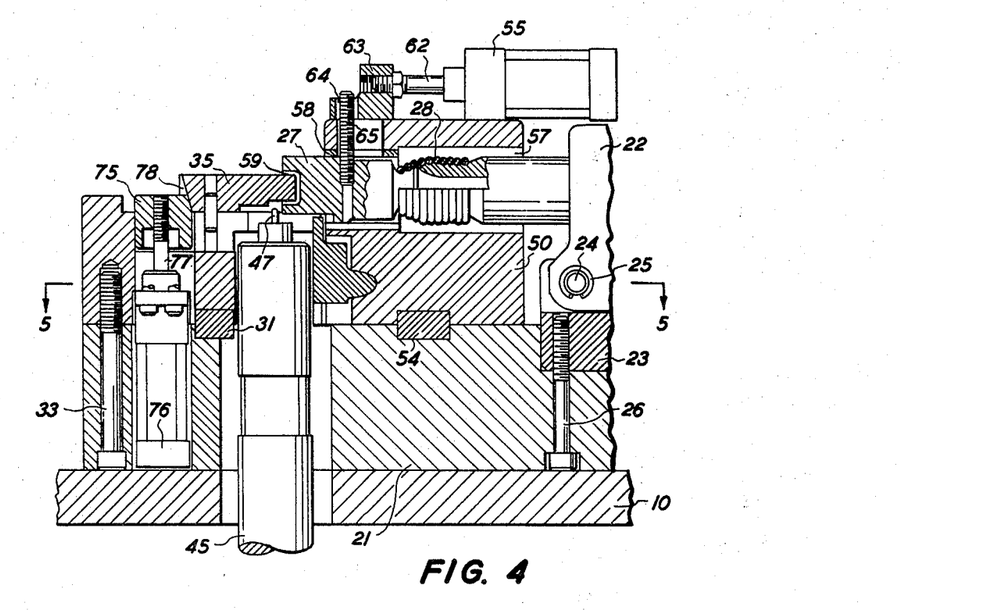
FIG. 4 is a sectional view taken along line 4—4 in FIG. 3 showing a movable wedge in a locking position.
Figure 5:
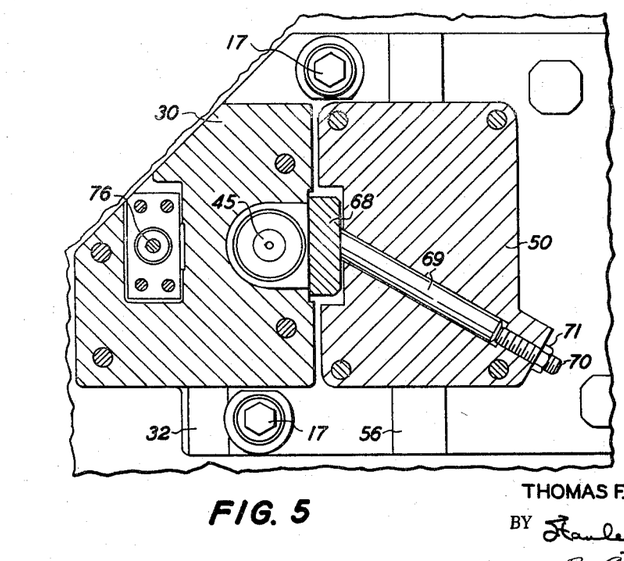
FIG. 5 is a sectional view taken along line 5—5 in FIG. 4 showing the adjustable holding block.

Referring now to FIGS. 2 through 5, individual work head 20 is secured to the table 10 by means of bolts 18 which pass through main base plate 21. Also located on the main base plate is vibratory pneumatic hammer 22. The hammer is pinned to an anchor plate 23 FIG. 2 by means of pins 24, the pins being held in place by snap rings 25. As shown in FIG. 5, the anchor plate which is constructed of hardened steel or the like, is held rigidly in a recess provided in the main base plate by means of four bolts 26. The latter arrangement thus makes the hammer effectively a part of the main base plate thereby assuring that the hammer is held securely during forming operations.

Operatively connected to the air hammer is a die member 27 having a precisely ground and polished cavity 29 machined therein which is capable of cooperating with anvil 35 to form a desired corner. The die, which is operatively mated with the vibratory hammer as shown in FIG. 5, is biased to a return position by means of biasing spring 28 so that the die moves to a return position preparatory to delivering the next blow.

Figure 9:
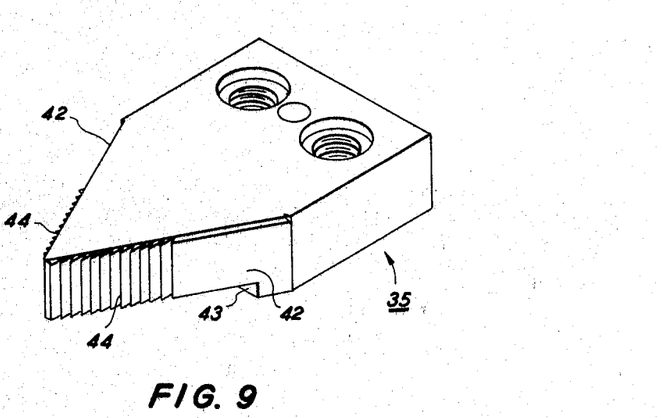
FIG. 9 is an isometric view of the anvil used in the present invention.

In the present invention, the corners of the cover panel are supported during the coining operation by anvils which are capable of moving in and out of contact with the side flanges forming the corner. As seen in FIG. 9 anvil 35 is machined so as to have working surfaces 42 which are capable of engaging the side flanges of a cover plate in supporting contact. For example, if a standard 90° corner is to be coined, the anvils working surfaces are machined to form this angle so that intimate contact is made and rigid support given to the interior surfaces of the side flanges during the coining operations. A recess 43 is provided in the bottom surface of the anvil to clear the return flange of a cover panel when the anvil moves into supporting contact with a rough formed corner. After placing the anvil in supporting contact with the cover, a rapid series of hammer-like blows are delivered into the corner area by means of die member 27 acting on the outside surfaces of the corner, the die thus acts in cooperating with the anvil to coin a corner positioned therebetween. The repeated hits by the die delivers sufficient mechanical energy from the hammer to form a corner. However, it should be noted, the magnitude of each hammer hit is below the energy level required to deform or warp a cover. That is, the resultant energy expended is sufficient to close a corner but each individual blow is below a energy level causing panel deformation or warpage. The seam, or the point where the flanges join, is mechanically worked to a condition where the seam, if detectable at all, is seen as a very thin straight line that can be easily covered by painting. Although the reciprocative forming forces are relatively low in comparison to a single compressive hit required for closure, the total energy expended in the small confined corner area is nevertheless considerable. The working surfaces of the anvil have a series of serrated edges 44 machined therein adapted to bite into the inner surfaces of the side flanges in order to hold material in the corner during coining operations. By restraining the material in the corner panel deformation or warpage is held to a minimum. That is, the warpage, if any, being undetectable to the naked eye.

Also affixed to the main base plate are two mounting blocks 30 and 50, respectively. Mounting block 50, herein referred to as the anvil return cylinder mounting block, is bolted and doweled to the main base plate by means of bolts 51 and dowel pin 52 (FIG. 3). To ensure that the return cylinder mounting block is properly positioned on the main base plate and that no slippage of the block will occur during the coinage operation, mounting block 50 is keyed to the base plate by means of key 54 (FIG. 5) positioned in key slot 56 provided in the base plate. As shown in FIG. 5, the return cylinder mounting block has a raised portion with an opening 57 through which the vibratory hammer may pass. A bronze bushing 58 pressed into the opening provides a surface in which the die member 27 rides. The bushing serves a two-fold function; first, it is a guide in which the hammer can ride as it is propelled forward and, secondly, the bushing accurately positions the die member in reference to the anvil 35 so that cavity 59 machined in the die will engage the anvil properly during forming operations.

Although the die member is biased to the return position by spring 28, oftentimes the hammer will "hang" in the extended position when the coining operation is completed. A head which is hung in the extended position will hold a cover to the anvil making it difficult to release the return flange from the anvil. Dislodged cylinder 55, capable of physically engaging the die member is employed to move the hammer head to the full return position at the end of the coining operation. The dislodged cylinder is positioned over the die on the raised portion of mounting block 50 and is affixed thereto by means of screws 61 (FIG. 3). Attached to the threaded end of piston rod 62 is sliding member 63 having a slotted hole 64 machined therein. Stud 65 is screwed into die member 27 and passes through the openings provided in the bronze bushing 58 and the mounting block so that it is operatively in communication with the sliding member 63. Slotted hole 64 is machined along the line of travel of the die member to allow the die to vibrate during forming operations but is restrictive enough so that the die will be moved to a return position, that is when the piston rod is moved back towards the dislodged cylinder. Thus, the dislodged cylinder is extended during forming operations to permit the die member to vibrate freely and is retracted to pull the die member to a return position at the cessation of forming operations thereby ensuring that the work piece will not be entrapped upon the anvil.

A second mounting block, 30, herein referred to as the anvil mounting block, is likewise keyed to the main base plate by means of key 31 riding in key slot 32 (FIG. 3) and secured thereto by means of four bolts 33. The anvil 35 is slidably mounted so that it can travel between a first plate loading position and a second plate supporting position. As seen in FIG. 3, anvil 35 is mounted upon slide 36 by means of screws 37 and a locating dowel 38. Slide 36 is adapted to move along a path of travel which is co-axial with the center line of the hammer and the die member. The anvil is capable of being moved into a position where it cooperates with cavity 59 machined in the die member to coin the corner formed by side flanges of the cover. The slide rides along ways (not shown) on mounting block 30 and is guided along the desired path of travel by guide members 39 and 40.

The motivating force used to slide or move anvil 35 along the ways is provided by two double acting hydraulic cylinders 53 securely affixed to the return cylinder mounting block 50. Piston rods 59, extending from the cylinders, are threaded into slide 36 and then pinned in place by means of pin 34 extending through the rods into the slide. When the cylinders are fully extended the slide and the anvil affixed thereto are moved back to a loading position to clear the return flange of cover plate 13. Two locating pins 79 are positioned on the slide and are used to properly index the cover in reference to the anvil during the loading operation. By so indexing all the corners of the cover, the plates are in position to properly receive the anvil when the slide is moved into the supporting position. As the slide moves forward, the locating pins, which are affixed to the slide, are moved back and the anvil itself makes final positioning of the plate prior to coining. With the anvil return cylinders 53 fully retracted, the working surfaces of the anvil will be in supporting contact with the side flanges of the cover.

It may be very probable that the throw of the double acting piston cylinders 53 is not in itself accurate enough to properly position the anvil in reference to the die member. A fine adjustment can be made by positioning adjustable member 68 to interrupt the return of the slide as it is being drawn in to a supporting position by cylinders 53. As seen in FIG. 4, adjustable member 68 is pivotably mounted on the end of shaft 69 and is capable of being finely adjusted by means of set screw 70 which finely positions shaft 69. In operation the slide will be returned to the desired position to properly engage a work piece and the adjusting head then abutted against the slide by means of set screw 70. The screw is then locked in this preset position by means of lock nut 71.

As noted, in order to clear the return flange on a cover having a plurality of corners, the anvils must be movable. It is therefore advantageous to provide the movable anvils with added support against the impact forces delivered during the vibratory hammering operations. A movable wedge 75, which is mounted on hydraulic cylinder 76, is adapted to be driven between the anvil 35 and the anvil mounting block 30 when the anvil is forward in a supporting position. Drawing the wedge between the mounting block and the anvil enables the anvil to sustain substantially higher impacting forces during coining. The movable wedge is threaded onto the shank of the piston rod 77 extending from hydralic cylinder 76 so that it moves up and down in association with a double acting piston (not shown) housed in the cylinder. Hydraulic cylinder 76 is mounted in an opening which extends through both the base plate and the anvil mounting block when the two are assembled as shown in FIG. 5. The wedge which is shown in the upper supporting position in FIG. 5, can be retracted into the mounting block to allow slide 36 to move back. Slide 36 thus is positioned to clear the return flange of a cover panel thereby enabling said panel to be loaded and unloaded from the apparatus. A tapered surface 78 is machined on the back of anvil 35 which mates with a similar taper machined on movable key 75. As the key extends, or moves upwardly, into a locking position, the two tapered surfaces meet to wedge the anvil into contact with a cover.

Cover panel 13 (FIG. 1) is provided with return flanges as well as side flanges. In a preformed cover plate the return flanges are formed to come into loose abutment or are overlapped at the corners. In the present invention it is sometimes desirous to weld the return flanges either before or after the corner forming operation to give the plate added strength. Referring once again to FIG. 5, a welding head 45 is shown extending through the table 10, base plate 26, and mounting block 30 so that welding electrode 47 is positioned directly below recess 43 in the anvil when the anvil is forward in the supporting position. As explained below, the welder can be electrically connected so that it will perform the welding function either before or after the coining operation. In some cases, for example when a relatively strong and ductile material is being worked, it may be advantageous to eliminate the welding step, the coined corner itself being capable of giving the plate rigidity.

Figure 6:
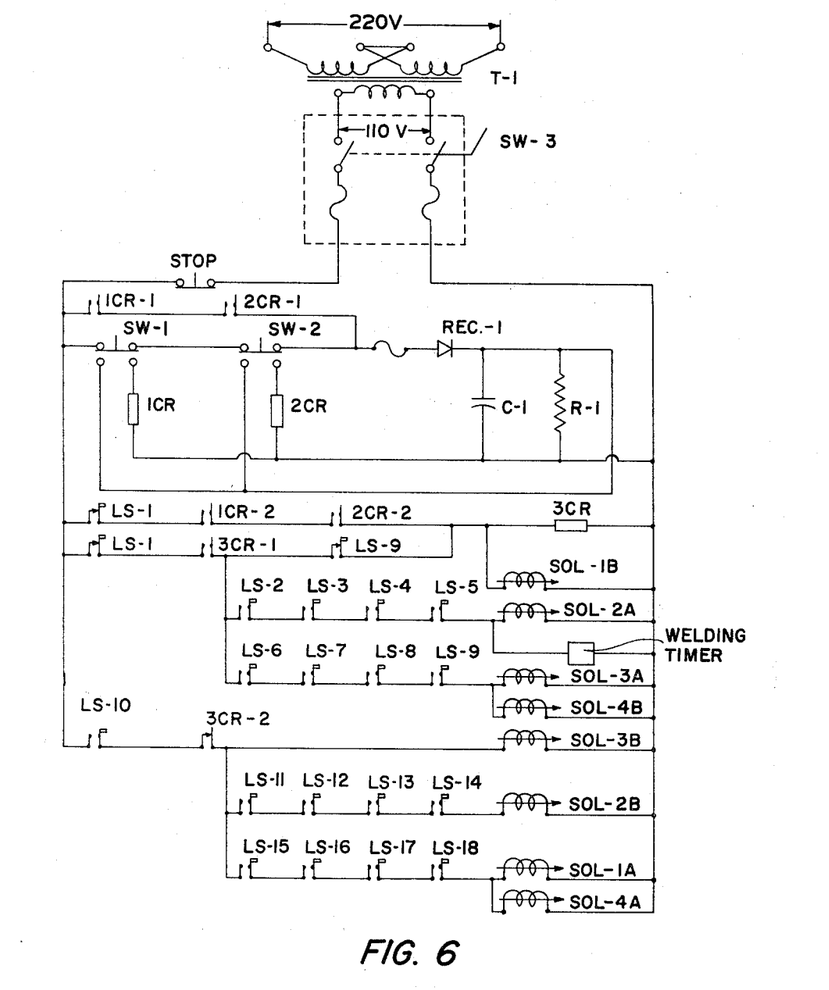
FIG. 6 is a schematic representation of the electrical system of the corner forming apparatus shown in FIG. 1.
Figure 7:
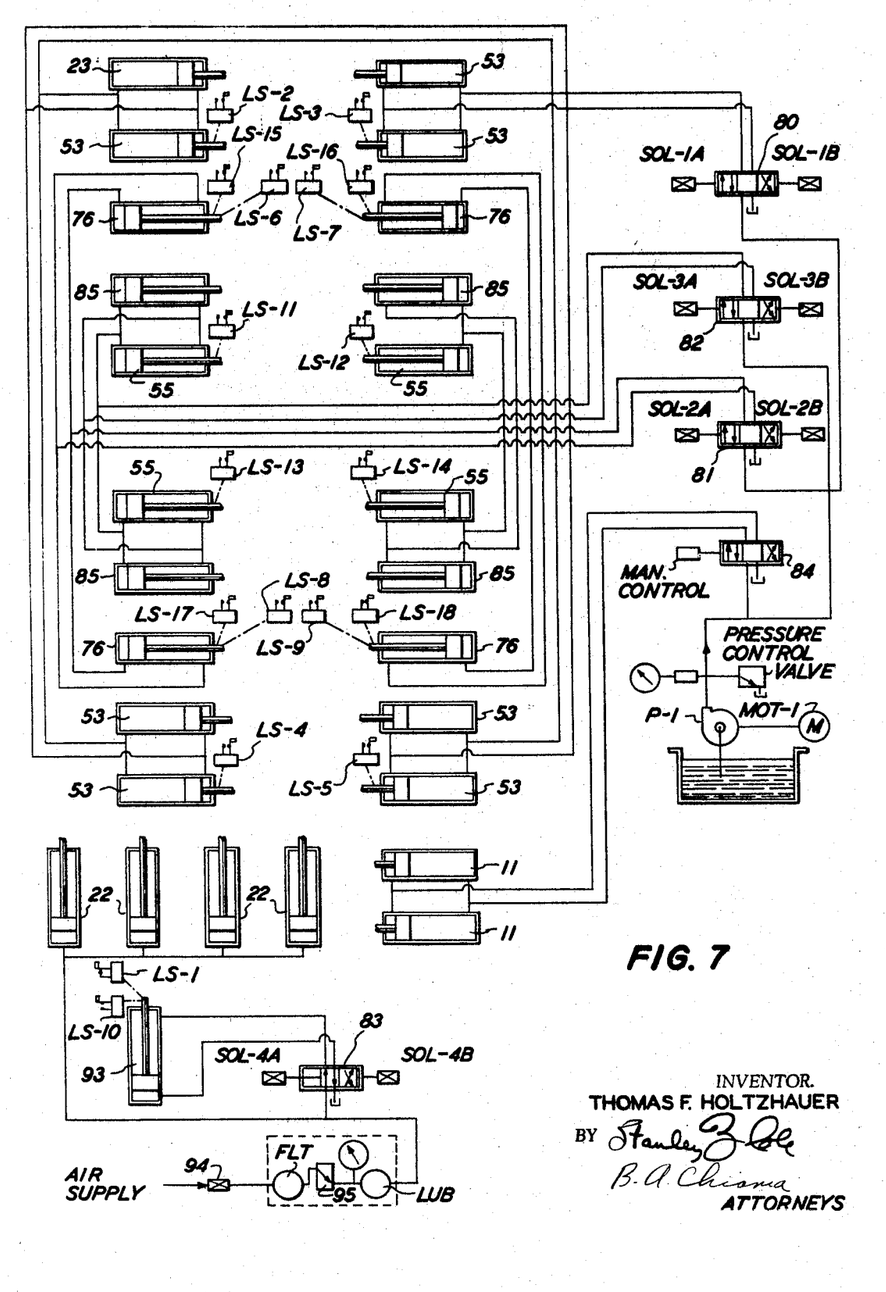
FIG. 7 is a schematic representation of the hydraulic system of the corner forming apparatus shown in FIG. 1 with portions depicted in section to show internal operations.

With the foregoing structure and arrangement of parts in mind, the operation of the present invention will now be considered in further detail with reference to the electrical diagram shown in FIGURE 6 to be read in conjunction with the schematic diagram of the hydraulic system shown in FIG. 7. As previously noted, the present invention is described in reference to apparatus having four work stations and, therefore, the electrical and hydraulic operation of this preferred embodiment will also be discussed in reference to apparatus having four work stations. It should be clear, however, that the number of work stations can be varied to facilitate cover panels of different configurations.

Referring now to the electrical diagram in FIG. 6, 220 volts AC are impressed across the primary side of transformer T–1. At this time, motor MOT–1, shown in the hydraulic schematic in FIG. 7, is started and delivers motivating power to pump P–1. Closing switch SW–3 (FIG. 6) allows the secondary coil of transformer T–1 to be energized supplying 110 volts to the control circuitry of the apparatus of the present invention. With the pump P–1 running and the secondary side of transformer T–1 energized, the operator depresses palm buttons SW–1 and SW–2, respectively, to begin the automatic sequence of operations.

The operator first loads a workpiece into the work stations, the workpiece being indexed against pins 79. As shown in FIG. 6, the switches SW–1 and SW–2 are normally in the open position with AC current passing through forward biased rectifier REC–1 to the RC time decay circuit made up of capacitor C–1 and resistor R–1. Capacitor C–1 becomes charged and remains so as long as the palm buttons are not depressed. Depressing the palm buttons makes SW–1 and SW–2 while breaking the circuit to rectifier REC–1 thereby allowing the RC circuit to decay through relays 1CR and 2CR. The decaying of the RC circuit causes relays 1CR and 2CR to remain energized for a period of time sufficient to close contacts 1CR–1 and 2CR–1. With contacts 1CR–1 and 2CR–1 in the closed position, a holding circuit is provided bypassing SW–1 and SW–2 the bypass circuit continuing to hold 1CR and 2CR energized after the RC circuit has fully decayed. At the same time, normally open switches 1CR–2 and 2CR–2 are closed providing a path of current to relay 3CR. Energizing relay 3CR closes normally opened contact 3CR–1 and opens the normally closed contact 3CR–2.

With 3CR energized, solenoid SOL–1B, which is in parallel with 3CR, is also energized causing 4-way valve 80 (FIG. 7) to be moved to a position where the piston located in anvil return cylinders 53 are retracted. Retracting cylinders 53 move the anvils into the workpiece until the travel of the slide is restricted by stop 68. Indexing pins 79, mounted on the anvil slide, are moved into contact with actuating linkage 90 making switches LS–2, LS–3, LS–4, and LS–5, respectively, on the four individual work stations.

As shown on the wiring diagram of FIG. 6, making switches LS–2 through LS–5 provide a path for current to reach solenoid SOL–2A through normally closed switch LS–1 and contact 3CR–1 which is being held closed by relay 3CR. With solenoid SOL–2A energized, 4-way valve 81 in the movable wedge circuit is actuated causing hydraulic pressure to extend the piston found in cylinders 76. Referring to FIG. 5, movable locking key 75 is forced into contact with the anvil 35 when cylinder 76 is extended causing the anvil to move into a work supporting position. A tapered face is machined on both the locking key and the anvil causing the anvil to be wedged into a locking position as cylinder 76 is extended.

Wired in parallel with solenoid SOL–2A is the welding timer 46 which actuates the welding heads 45 for a predetermined period of time. As previously noted, the welding heads are located in the anvil mounting blocks so that the welding tip is just below the anvil when it is in a work supporting position. Enabling the welders causes a spot weld to be placed at the point where the two return flanges join in the corner. It should be noted that it may be desirous in many cases to weld the return flange prior to moving the anvils into the work so as to give the workpiece added rigidity during forming. That is, in the case of a piece which could be distorted by the anvils being wedged into a corner. In such cases, the welding timers can be wired into the circuit at some point prior to the anvil locking operation thereby welding the return flanges prior to locking the panel in position.

As movable wedge 75 is raised into the locking position, it also acts as cam to actuate lever means 91 making limit switches LS–6, LS–7, LS–8, and LS–9. As shown in FIG. 6, switch LS–9 is also electrically wired to a holding circuit to relay 3CR. Making switch LS–9 allow current to reach relay 3CR through normally closed LS–1 and 3CR–1 by bypassing 1CR–2 and 2CR–2. With the holding circuit made, the relays 1CR and 2CR are no longer needed to hold 1CR–2 and 2CR–2 closed allowing the release of palm switches SW–1 and SW–2 freeing the operator.

Figure 2:
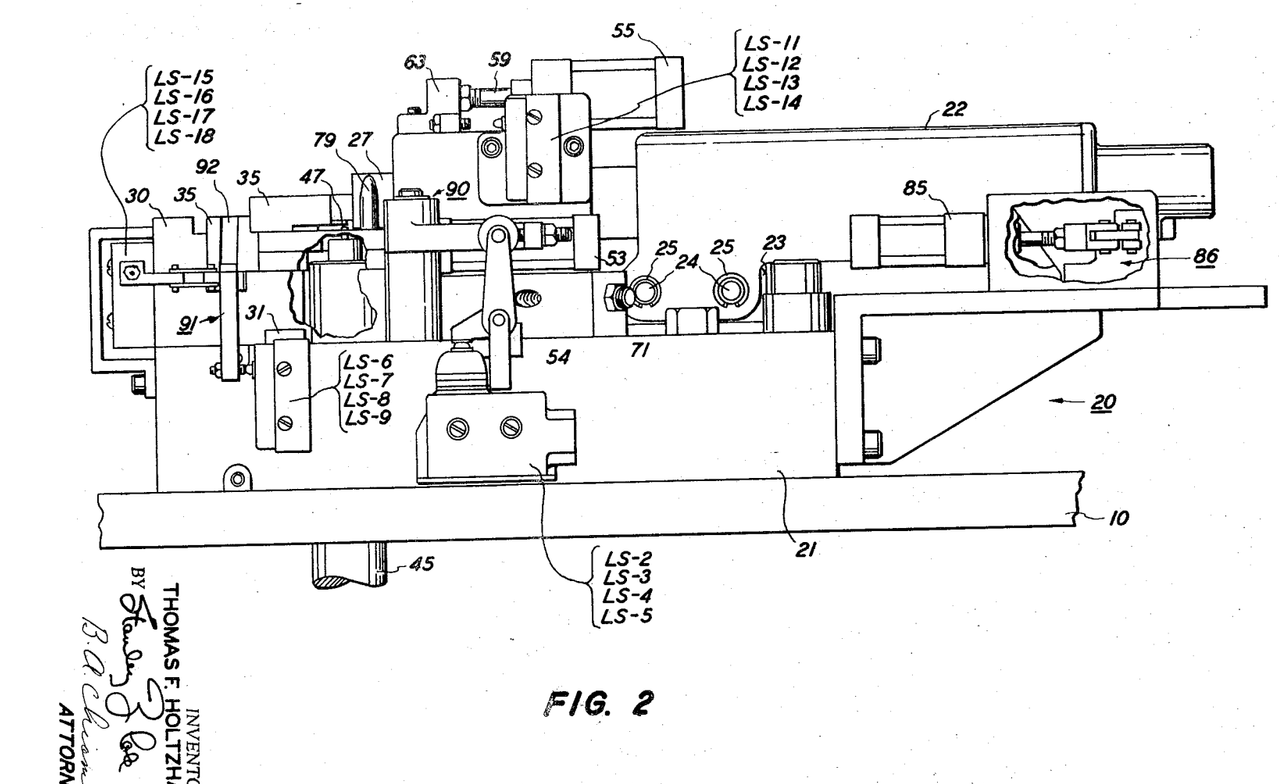
FIG. 2 is a side elevation showing a single of the work station.

A circuit is now provided permitting energization of solenoids SOL–3A and SOL–4B, respectively. As shown in FIG. 7, energizing solenoid SOL–3A actuates four-way valve 82 allowing hydraulic pressure to extend cylinder 85 (FIG. 2 and FIG. 3). Extending cylinder 85 causes hammer trigger 87 to be depressed through means of linkage 86.

Depressing the trigger causes the pneumatic hammers 22 to be activated thereby delivering vibratory energy into the corners to be formed. Solenoid SOL–4B, located in the pneumatic system (FIG. 7) and wired in parallel with SOL–3B, also energized at the same time that the hammer trigger is actuated. Solenoid SOL–4B moves four-way valve 83 to a position permitting air pressure to extend timing cylinder 93. Air is supplied under pressure through manual shut off valve 94 to automatic control 95. By manually setting the automatic control valve, the time necessary to fully extend air cylinder 93 can also be controlled. As cylinder 93 extends it first closes switch LS–10 in the hammer dislodge circuit, however, because normally closed contact 3CR–2 is now being held open by relay 3CR, no current can reach the dislodge solenoid SOL–3B. Cylinder 93 continues to extend at a predetermined rate until it next opens normally closed switch LS–1 thus de-energizing solenoids SOL–1B, SOL–2A, SOL–3A, and SOL–4B as well as de-energizing relay 3CR. With relay 3CR de-energized, contact 3CR–2 closes providing a current path to solenoid SOL–3B.

Energizing solenoid SOL–3B moves four-way valve 82 into a position causing the dislodge cylinder 55 and the trigger actuating cylinder 85 to retract cutting off the hammer operation. As can be seen, the amount of time that the reciprocating hammers are in operation is determined by the time gap existing between the actuation of solenoid SOL–3A and solenoid SOL–3B. As noted, the time gap is controlled by setting automatic control valve 95 to regulate the rate at which the timing cylinder 93 extends. Thus, the time that the hammer acts on a corner can be directly controlled by adjusting the automatic control valve 95.

As shown in FIG. 3 and FIG. 5, retracting dislodge cylinder 55 will physically move the male die member 27 back free of the workpiece mounted on anvil 35. Fully retracting dislodge cylinder 55 closes switches LS–11, LS–12, LS–13, and LS–14 by means of actuating arm 97 and, in turn, provides a path for current to energize solenoid SOL–2B in the movable wedge circuit.

Referring now to FIG. 7, energizing solenoid SOL–2B repositions four-way valve 81 causing the wedge actuating cylinder to retract pulling movable wedge 75 from its supporting position behind anvil 35. Cylinder 76 continues to retract until the movable wedge is free of anvil 35. Lever means 91 which is riding in cam slot 92 in the locking key, moves to a position making switches LS–15, LS–16, LS–17 and LS–18 permitting solenoids SOL–1A and SOL–4A (FIG. 6) to be energized. Energizing solenoid SOL–1 repositions four-way valve 80 causing anvil return cylinders 53 to extend which moves the anvil slide back from the work piece. The operator then removes the work from the apparatus. Solenoid SOL–4A, located in the pneumatic system, causes timing cylinder 93 to retract closing switch LS–1 and also opens switch LS–10 preparatory to the start of a new cycle.

Referring once again to FIG. 7, it can be seen that the pump P–1 also supplies hydraulic pressure to the table raising means, hydraulic cylinders 11. A manual control valve 84 is provided to enable the operator to raise and lower the table to any desired height.

As can be seen, the present invention provides apparatus which will automatically close a plurality of corners on a cover or the like simultaneously in a relative short period of time. The apparatus has a wide range of application in that work pieces of various sizes and shapes can readily be accommodated therein. Furthermore, the operator has at his disposal means to control the amount of energy that will be delivered into the work zone, that is, he can control the operating time that the hammers are delivering energy. The apparatus is adapted to coin the corner of a work piece so that it can be finished painted or the like without further operation performed thereon such as grinding or welding. Although the total energy expended is sufficient to coin a corner, the level or intensity of the energy is such that extremely long tool life can be obtained.

While the invention has been described with reference to the structure disclosed herein, it is not confined to the details set forth, and this application is intended to cover such modifications or changes as may come within the purpose of the improvements or the scope of the following claims.

What is claimed is:

1. Apparatus for mechanically closing a panel by simultaneously coining the corners formed by the side flanges of said panel including:
    a plurality of work stations equal in number to the corners to be coined adapted to support a panel therebetween, each station having,
    anvil means having working surfaces that are complimentary to the corner being coined and adapted to support said panel during the coining operation,
    means to move said anvil from a first plate loading position into a second supporting position,
    a die member having a face adapted to cooperate with said anvil in the supporting position to close a corner in a metal panel positioned therebetween,
    means to rapidly and repeatedly move said die member into said corner whereby mechanical work of a level sufficient to finish close said panel is delivered,
    and guide means to direct said die member towards and away from said corner along a path of travel described by the bi-sector of an angle formed by the anvil work surfaces.

2. The apparatus of claim 1 having a frame about which a base plate is rotatably mounted, said base plate adapted to receive said work stations at various locations whereby panels of various shapes and sizes can be facilitated thereon.

3. The apparatus of claim 2 having further means to lock said anvil in the supporting position.

4. The apparatus of claim 2 wherein the working surfaces of said anvil have a series of knife-like serrations positioned thereon adapted to retain material in a corner during coining operations.

5. The apparatus of claim 4 having further means to control the amount of work delivered into said corner.

6. Apparatus for mechanically closing the corners formed by the meeting of the side flanges of a panel including:
- a movable support member having working surfaces thereon complementary to the corner to be formed by the side flanges of a panel,
- means to move said support member from a panel loading position to a panel supporting position wherein the working surfaces are arranged to support the corner forming flanges on said panel,
- a die member having a working face being adapted to cooperate with the working surfaces on said support member to mechanically work the two side flanges,
- means to move said die member in and out of contact with said panel with a force insufficient to damage said plate,
- means to control the total amount of work energy delivered into the corner.

7. The apparatus of claim 6 wherein the working surfaces on said movable support member have a series of knife-like serrations thereon which are adapted to retain metal in the corner area during the closing operation.

8. The apparatus of claim 7 having further means to guide said die member in and out of contact with said panel along a path of travel substantially described by a line bisecting angle formed by said working surfaces.

9. The apparatus of claim 8 wherein said die face comprises a polished cavity capable of cooperating with said support means through a panel to form a substantially homogeneous corner.

10. The apparatus of claim 9 having welding means positioned beneath said movable support member and arranged to weld a return flange on said panel when the support member is in a supporting position.

References Cited

UNITED STATES PATENTS

| | | | |
|---|---|---|---|
| 3,172,449 | 3/1965 | Stanton | 72—399 |
| 3,184,951 | 5/1965 | Hilton | 72—389 |

RONALD D. GREFE, *Primary Examiner.*

U.S. Cl. X.R.

72—404